United States Patent
Cech et al.

(10) Patent No.: US 11,031,012 B2
(45) Date of Patent: Jun. 8, 2021

(54) SYSTEM AND METHOD OF CORRELATING MOUTH IMAGES TO INPUT COMMANDS

(71) Applicant: Joyson Safety Systems Acquisition LLC, Auburn Hills, MI (US)

(72) Inventors: Leonard Cech, Auburn Hills, MI (US); Jason Lisseman, Auburn Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 16/995,167

(22) Filed: Aug. 17, 2020

(65) Prior Publication Data

US 2021/0035586 A1 Feb. 4, 2021

Related U.S. Application Data

(63) Continuation of application No. 15/934,721, filed on Mar. 23, 2018, now Pat. No. 10,748,542.

(Continued)

(51) Int. Cl.
*G10L 15/25* (2013.01)
*G06F 3/16* (2006.01)
(Continued)

(52) U.S. Cl.
CPC .............. *G10L 15/25* (2013.01); *B60R 11/04* (2013.01); *G06F 3/167* (2013.01); *G06T 7/20* (2013.01);
(Continued)

(58) Field of Classification Search
CPC ......... G10L 15/25; G10L 25/03; G10L 25/48; G10L 15/285; G06T 7/254; G06T 7/20; B60R 11/04; G06F 3/167
See application file for complete search history.

(56) References Cited

U.S. PATENT DOCUMENTS 6,243,683 B1  6/2001  Peters
6,567,775 B1  5/2003  Maali et al.
(Continued)

FOREIGN PATENT DOCUMENTS

EP  0683481     11/1995
JP  08187368 A   7/1996
(Continued)

OTHER PUBLICATIONS

Matai, et al., "Design and Implementation of an FPGA-based Real-Time Face Recognition System", 2011 IEEE 19th Annual International Symposium on Field-Programmable Custom Computing Machines, Salt Lake City, UT, 2011, pp. 97-100.

(Continued)

*Primary Examiner* — Mohammad K Islam
(74) *Attorney, Agent, or Firm* — Meunier Carlin & Curfman LLC

(57) ABSTRACT

A system for automated speech recognition utilizes computer memory, a processor executing imaging software and audio processing software, and a camera transmitting images of a physical source of speech input. Audio processing software includes an audio data stream of audio samples derived from at least one speech input. At least one timer is configured to transmit elapsed time values as measured in response to respective triggers received by the timer. The audio processing software is configured to assert and de-assert the timer triggers to measure respective audio sample times and interim period times between the audio samples. The audio processing software is further configured to compare the interim period times with a command spacing time value corresponding to an expected interim time value between commands, thereby determining if the speech input is command data or non-command data.

18 Claims, 9 Drawing Sheets

Related U.S. Application Data

(60) Provisional application No. 62/475,510, filed on Mar. 23, 2017.

(51) Int. Cl.

| | | |
|---|---|---|
| *G10L 15/28* | (2013.01) | |
| *B60R 11/04* | (2006.01) | |
| *G06T 7/20* | (2017.01) | |
| *G10L 25/48* | (2013.01) | |
| *G10L 25/03* | (2013.01) | |
| *G06T 7/254* | (2017.01) | |
| *B60R 11/00* | (2006.01) | |
| *G10L 15/08* | (2006.01) | |

(52) U.S. Cl.
CPC ............ *G06T 7/254* (2017.01); *G10L 15/285* (2013.01); *G10L 25/03* (2013.01); *G10L 25/48* (2013.01); *B60R 2011/0005* (2013.01); *G06T 2207/30201* (2013.01); *G06T 2207/30248* (2013.01); *G06T 2207/30268* (2013.01); *G10L 2015/088* (2013.01)

(56) References Cited

U.S. PATENT DOCUMENTS

| | | |
|---|---|---|
| 7,472,063 B2 | 12/2008 | Nefian et al. |
| 7,957,542 B2 | 6/2011 | Sarroukh et al. |
| 8,442,820 B2 | 5/2013 | Kim et al. |
| 8,700,392 B1 | 4/2014 | Hart et al. |
| 8,913,103 B1 | 12/2014 | Sargin et al. |
| 9,533,687 B2 | 1/2017 | Lisseman et al. |
| 9,832,583 B2 | 11/2017 | Cohen et al. |
| 9,881,610 B2 | 1/2018 | Connell, II et al. |
| 9,922,646 B1 | 3/2018 | Blanksteen |
| 10,374,816 B1 | 8/2019 | Leblang et al. |
| 2002/0035475 A1 | 3/2002 | Yoda |
| 2004/0220705 A1 | 11/2004 | Basir et al. |
| 2009/0015651 A1 | 1/2009 | Togami et al. |
| 2009/0055180 A1 | 2/2009 | Coon et al. |
| 2009/0150149 A1 | 6/2009 | Culter et al. |
| 2010/0194863 A1 | 8/2010 | Lopes et al. |
| 2010/0332229 A1 | 12/2010 | Aoyama |
| 2011/0071830 A1 | 3/2011 | Kim et al. |
| 2011/0224978 A1 | 9/2011 | Sawada |
| 2012/0069131 A1 | 3/2012 | Abelow |
| 2013/0030811 A1 | 1/2013 | Olleon et al. |
| 2013/0190043 A1 | 7/2013 | Kulas |
| 2014/0187219 A1 | 7/2014 | Yang et al. |
| 2014/0350924 A1 | 11/2014 | Zurek et al. |
| 2014/0365228 A1 | 12/2014 | Ng-Thow-Hing et al. |
| 2015/0023256 A1 | 1/2015 | Liu et al. |
| 2015/0058004 A1 | 2/2015 | Dimitriadis et al. |
| 2015/0154957 A1 | 6/2015 | Nakadai et al. |
| 2015/0161992 A1 | 6/2015 | Jung |
| 2015/0206535 A1 | 7/2015 | Iwai |
| 2015/0254058 A1 | 9/2015 | Klein et al. |
| 2015/0279364 A1 | 10/2015 | Krishnan et al. |
| 2015/0324636 A1 | 11/2015 | Bentley et al. |
| 2015/0340040 A1 | 11/2015 | Mun et al. |
| 2016/0064000 A1 | 3/2016 | Mizumoto et al. |
| 2016/0100092 A1 | 4/2016 | Bohac et al. |
| 2016/0140964 A1 | 5/2016 | Connell, II et al. |
| 2016/0185354 A1 | 6/2016 | Lisseman et al. |
| 2016/0358604 A1 | 12/2016 | Dreuw |
| 2017/0113627 A1 | 4/2017 | Ding |
| 2017/0133036 A1 | 5/2017 | Cohen et al. |
| 2017/0309275 A1 | 10/2017 | Takayanagi et al. |
| 2017/0309289 A1 | 10/2017 | Eronen et al. |
| 2017/0351485 A1 | 12/2017 | Kohler et al. |
| 2018/0018964 A1 | 1/2018 | Reilly et al. |
| 2018/0077492 A1 | 3/2018 | Yamada et al. |
| 2018/0174583 A1 | 6/2018 | Zhao et al. |
| 2018/0190282 A1 | 7/2018 | Mohammad et al. |
| 2018/0233147 A1 | 8/2018 | Tukka et al. |
| 2019/0037363 A1 | 1/2019 | Tzirkel-Hancock et al. |
| 2019/0073999 A1 | 3/2019 | Prémont et al. |
| 2019/0355352 A1 | 11/2019 | Kane et al. |

FOREIGN PATENT DOCUMENTS

| | | |
|---|---|---|
| WO | 2017003903 | 1/2017 |
| WO | 2017138934 | 8/2017 |

OTHER PUBLICATIONS

Gupta, et al., "Characterization Exhaled Airflow from Breathing and Talking", Indoor Air, 20, 31-39.

International Search Report and Written Opinion in PCT/US2018/024136. dated Jul. 10, 2018. 13 pages.

International Preliminary Report on Patentability issued for Application No. PCT/US2018/024136, dated Oct. 3, 2019.

The Extended European Search Report issued for European Application No. 18772045.3, dated Dec. 20, 2019, 9 pages.

Communication Pursuant to Article 94(3) EPC, issued for Application No. 18772045.3, dated Oct. 12, 2020, 6 pages.

Image #n → Mouth is Moving → Location (Xn, Yn)

Image #n+1 → Mouth is Moving → Location (Xn+1, Yn+1)

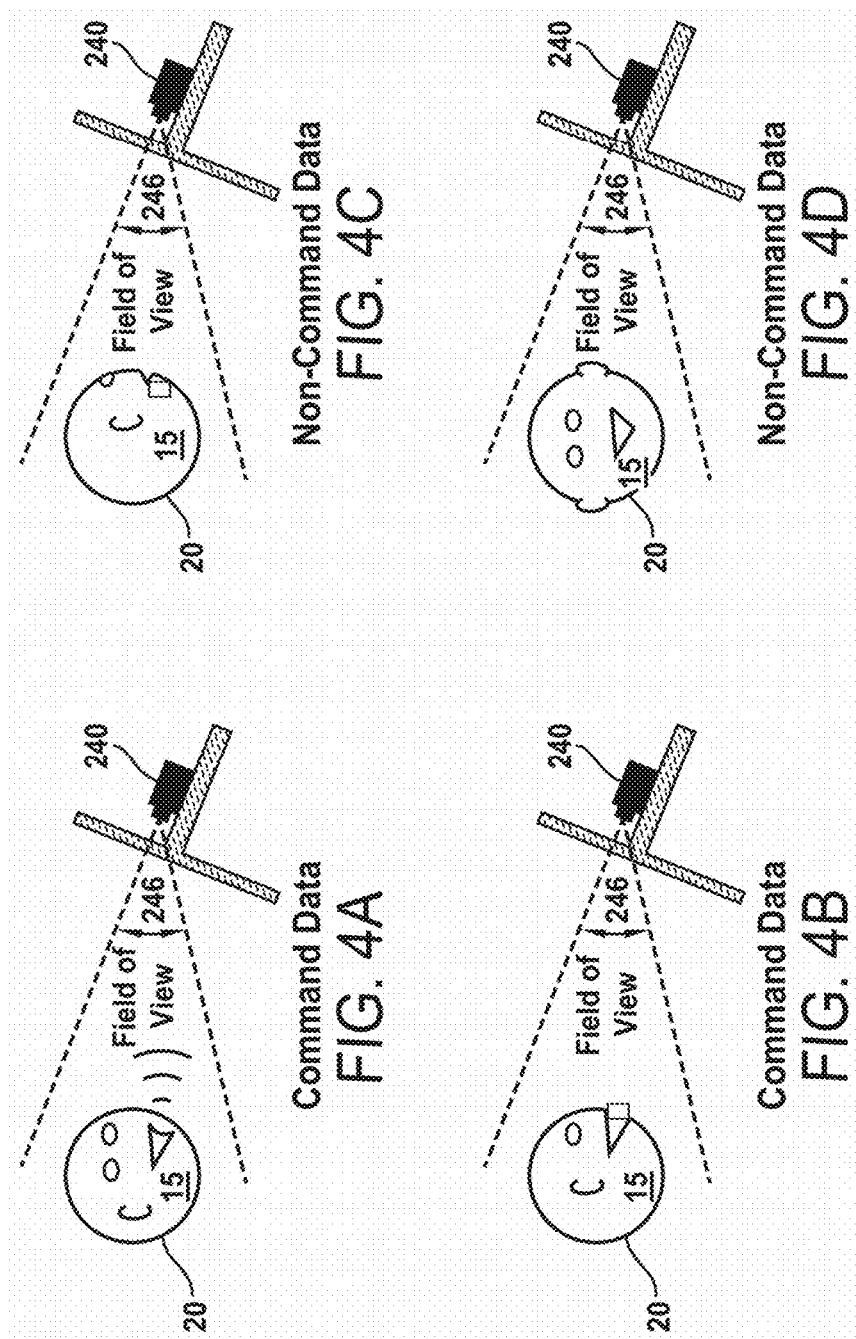

Image #n+1k → change camera parameters to track mouth movements

Image #n+2k

Image #n+3k

Image #n+4k

SYSTEM AND METHOD OF CORRELATING MOUTH IMAGES TO INPUT COMMANDS

CROSS REFERENCE TO RELATED APPLICATIONS

This application claims priority to and incorporates entirely by reference U.S. Provisional Patent Application Ser. No. 62/475,510 filed on Mar. 23, 2017 entitled System and Method of Correlating Mouth Images to Input Commands.

BACKGROUND OF THE INVENTION

This disclosure relates to the field of automatic speech recognition and receiving audible commands from a speech input device, wherein the audible commands are cross-checked with image data from an imaging device or image sensor such as a camera focused on a source of the audible commands. Spoken words are created through mouth movements adjusting sound waves that are transferred from the speaker's mouth through air. Vehicle speech entry systems for users often consist of one or more microphones positioned to detect the sound. Typically, these microphones are electromechanical assemblies which mechanically resonate over a range of the mechanical frequencies of speech (sound waves at frequencies less than 20 khz). Digital voice tokens (temporal speech fragments) can be sent to artificial voice recognition systems and converted to digital requests (e.g. information technology requests in the vehicle infotainment or vehicle control systems; or external web-based service requests transmitted through wireless networks). The result of these audible requests is to simplify and/or automate a desired function to enhance user comfort and/or convenience and/or safety—often all three.

Numerous digital and algorithm-driven methods have been developed in an attempt to improve the performance of artificial voice recognition systems. For example, token matching systems based on learning a specific user speech characteristic from audible content is often used to improve the success rates of artificial voice recognition systems. Another typical method is to use artificial intelligence techniques to match the speech characteristic of the voice input with one or more phonetic characteristics (e.g. languages, pronunciations, etc.). One additional method, that is often used to reduce noise, is to require that the user press an electromechanical button, often on the steering wheel, to limit voice capture to the times when the button is depressed.

In some cases a sound detection and processing system uses one or more microphones, and subsequent signal processing is utilized to reduce the effects of noise (including road noise, noise from vehicle entertainment systems, and non-user audible inputs). Noise reduction can be accomplished through appropriate geometric placement of the microphones to enhance user voice inputs while reducing noise. Also, appropriate symmetric placement of multiple microphones relative to the position of the user during normal driving helps reduce the effects of outside noise sources. Specifically, microphones are positioned symmetrically relative to the boresight vector of the natural mouth position while the eyes are naturally facing forward e.g. if the user is a driver of the vehicle, "eyes on the road." The subsequent phase cancellation processing of the microphone inputs has been shown to substantially reduce the effects of noise. In this example, the phase of the user speech signal detected at the multiple microphones is the same (due to same travel distance from the user's mouth), while the phase of the noise from other locations inside/outside the vehicle will have different phases at the multiple microphones and thus this sound can be filtered out through various signal processing techniques.

Errors in automated speech recognition processes can lead to incorrectly determining the intended user speech, resulting in potential frustration (and/or distraction) of the user. For example, the speech recognition might incorrectly interpret the sound and make the wrong request (e.g. calling the wrong person). Or, the speech recognition may ignore the request. One goal of the automated speech recognition process, including the sound detection and measurement system is to maximize the quality of the user's speech input sounds (signal) and minimize un-desired sounds (noise); e.g. maximize Signal to Noise (SNR) ratio.

One problem in the field of automated speech recognition lies in the lack of credible ways for prior art systems to double check a perceived speech input with additional out-of-band information (i.e., information other than standard audio signal analysis). A need in the art exists in configuring automatic speech recognition systems so that user commands, issued to the system for vehicle operation and performance, are confirmed in terms of origin, authorization, and content.

BRIEF SUMMARY OF THE INVENTION

In one embodiment, this disclosure presents a system for automated speech recognition comprising computer memory, a processor executing imaging software and audio processing software, a camera transmitting a plurality of sequential frames of digital pixel data from an image acquired within a field of view associated with the camera, a speech input device transmitting to said audio processing software an audio data stream of audio samples derived from at least one speech input, and at least one timer configured to transmit to said computer memory elapsed time values as measured in response to respective triggers received by said at least one timer. The audio processing software is configured to assert and de-assert the timer triggers to measure respective audio sample times and interim period times between the audio samples. The audio processing software is further configured to compare the interim period times with a command spacing time value corresponding to an expected interim time value between commands.

In a second embodiment, a system for automated speech recognition includes a computer memory, a processor executing imaging software, audio processing software, and command processing software, a camera transmitting a plurality of sequential frames of digital pixel data from an image acquired within a field of view associated with the camera, and a speech input device transmitting to the audio processing software an audio data stream of audio samples derived from at least one speech input. The imaging software isolates, from the frames of digital pixel data, a subset of pixels representing a physical source of the speech input. The command processing software may be a subroutine of the computer readable instructions stored in memory and correlates, on a time basis, each audio sample to respective subsets of pixels representing the physical source in respective groups of sequential frames of image data. The imaging software is configured to track multiple positions of the physical source of speech input by deriving respective positions of the physical source from the respective subsets of pixels. The command processing software validates an audio sample as a command according to the respective positions of said physical source of speech input relative to said speech input device.

In yet another embodiment, a system of data acquisition for automated speech recognition includes a computer memory, a processor executing imaging software, audio processing software, command processing software, and codec software. The system further includes a camera transmitting, to the memory, a plurality of frames of digital pixel data from an image acquired within a field of view associated with the camera. A speech input device transmits, to the memory, a set of digital audio data streams derived from respective speech inputs. The imaging software isolates, from the frames of digital pixel data, a subset of pixels representing a source of the speech input. The processor generates a voice token profile for the respective sets of digital audio samples based on the subset of pixels representing the source of speech input, wherein the processor stores in the database each respective speech profile, filters the database for identified speech profiles associated with individual users, and stores the identified speech profiles as respective codecs for respective individuals.

BRIEF DESCRIPTION OF THE FIGURES

FIG. 4A is a side elevation view of a camera installed in a vehicle having a user's head in a field of view with the user's head turned slightly to the user's right.

FIG. 4B is a side elevation view of a camera installed in a vehicle having a user's head in a field of view with the user's head directly facing the camera with the user's eyes on the road.

FIG. 4C is a side elevation view of a camera installed in a vehicle having a user's head in a field of view with the user's head turned slightly to the user's left.

FIG. 4D is a side elevation view of a camera installed in a vehicle having a user's head in a field of view with the user's head turned sharply to the user's far right.

DETAILED DESCRIPTION

Figure 1B:
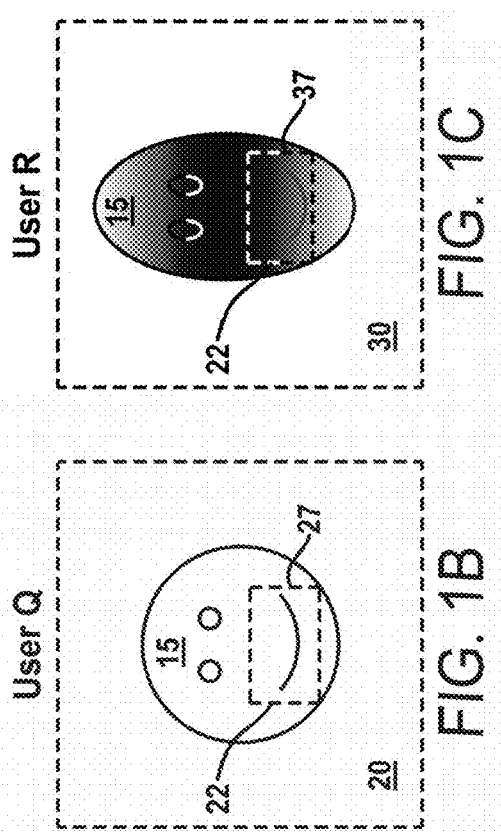
FIG. 1B is a first frame of image data collected by a camera having a first user in the camera field of view and associated with the automated speech recognition system as described herein.

Terms in this disclosure should be read in light of the broadest interpretation for the context. For example, the term "camera" includes a full range of devices operating at different wavelengths, for example RGB, infrared band lights, and synchronized light sources which use sinusoidal LED or VCSEL IR lasers to derive intensity and depth images. Furthermore, the term "camera" includes but is not limited to 3D time of flight cameras, instead of simply a device gathering image frames. Other embodiments include image sensors that collect "point cloud" data frames. These point cloud data frames include the intensity and distance from the sensor at each pixel. Cameras included within the scope of this disclosure also may be "multi-spectral" 2-D or 3-D cameras, for which each pixel can include the reflectivity at multiple wavelengths and the distance from camera to the reflecting surface. Use of a "camera" in this disclosure may encompass both fixed imaging devices and those that sweep about an area for data collection, as well as corresponding functionality in either a fixed or adjustable field of view.

The use of a singular apparatus or element in this disclosure also enables comparable embodiments utilizing multiple instances of the same apparatus or element as necessary to accomplish the goals herein. Accordingly, embodiments of this disclosure include, but are not limited to, those configurations in which multiple imaging devices, multiple speech input devices, and multiple computer hardware components act in concert for the objectives discussed herein.

In an embodiment of this disclosure, physical, or "mechanical," resonant motions, created by an individual's mouth and tongue movements affecting sound waves emanating from vocal cords, are converted first to an analog electrical signal that can be further processed through analog signal processing methods (amplification, frequency filtering) and/or converted to digital signals and further processed through digital signal processing methods. The resultant signals can be used in various automated speech recognition applications including hands free voice communications, voice control or voice function requests. In general, and without limiting the description to any single scope, the embodiments of this disclosure utilize portions of an audio signal that has been retrieved by microphones or any speech input device configured to sense sound waves and convert the sound energy to another format, such as analog or digital electrical signals. The audio signals at issue typically emanate from an individual speaking and interacting with an User Audio-Visual monitoring system AVMS and an automated speech recognition system described herein. Portions of the audio signals gathered and analyzed according to this description are referred to as "speech inputs" collectively. Speech inputs may be further divided into individual "voice tokens" representing portions of a word, phrase, or sound within the overall audio signal or a single speech input. In other words, for purposes of this disclosure a "voice token" may be considered a smallest distinguishable section of a speech input and may be parsed out of a speech input for further evaluation by the systems described herein.

The system and methods described herein make reference to an individual user of an Audio-Visual monitoring system, which is most often, but not always, a driver in a vehicle. References to users, drivers, and other vehicle occupants, however, are not intended to limit the scope of the embodiments of the automated speech recognition system described herein.

Automated speech recognition systems and applications of this disclosure are implemented and made available by electronic communications and transmissions to an overall Audio-Visual monitoring systems (AVMS) 100 that uses the automated speech recognition system 200 to derive extensive spatial/temporal information about one using and interacting with the AVMS 100, typically, but not limited to, a vehicle user 15. The derived information may include but is not limited to, user identification of unique individuals, detection and tracking of position of the center of the face, face size, shape and rotational orientation of the user face, as well as specific features of the face, such as eyes, nose, lips, and ears. By assimilating an automated speech recognition system 200 into an overall Audio-Visual Monitoring System (AVMS) 100, the computerized methods and systems described in this disclosure allow for detecting and tracking other user conditions or appearance features, including but not limited to facial hair, masks, eyeglasses, sunglasses, and/or activities and conditions such as drinking, breathing, smoking, eating, talking on cellphone, coughing, yawning, squinting, frowning, crying, yelling, and the like. It is technically feasible that AVMS 100 can be used to derive physiological information about the user 15 such as lip-reading patterns, heart rate, respiration rate, skin temperature and other user attributes that are not readily apparent from a mere image, even in video format.

In one embodiment, shown in FIG. 1, an Audio-Visual Monitoring System (AVMS) 100 includes or has access to, via electronic communications, an automated speech recognition system 200 as described herein. The automated speech recognition system 200 includes a camera 240 in electronic communication with a processor 250 and computer readable memory 215 with software instructions stored in a non-transitory computer readable medium. The non-transitory computer readable medium and memory 215 are similarly in electronic communication with at least one dictionary 315 of previously trained words and phrases stored in a database 300. The dictionary can include one or more "keyword" phrases and one or more "command" phrases. A "keyword" phrase consists of one or more words that can be used to initiate the speech recognition process, for example "Begin command" or the like. Once the "keyword" phrase is detected this is generally followed by "command" phrase requests (for example, "do I have enough charge to reach my destination?). The database 300 may be stored in additional storage structures that are local to the memory 215 or, in different embodiments, the camera 240, processor 250, and memory 215 may have access to remote server memory and operations/applications connected to the automated speech recognition system over a network. Networks connecting components described herein include Internet, telephone, cellular, satellite, and any other wired, wireless, or fiber optic transmission schemes sharing information across different geographic locations.

Figure 1C:
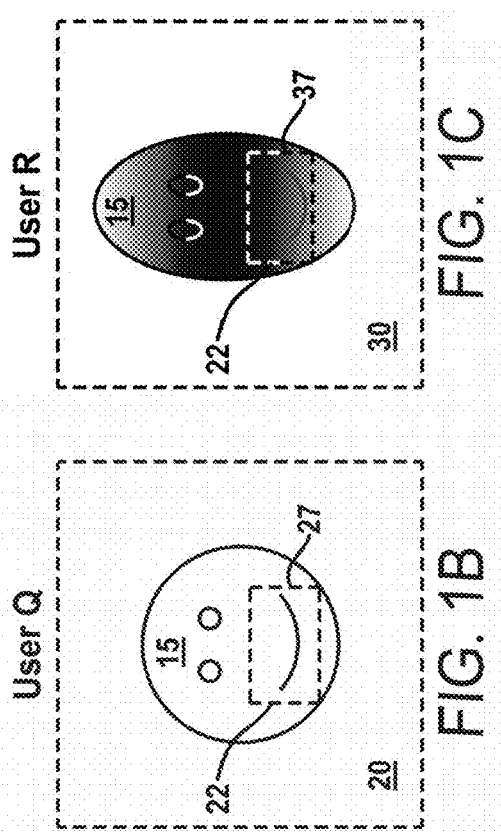
FIG. 1C is a second frame of image data collected by a camera having a second user in the camera field of view and associated with the automated speech recognition system as described herein.
Figure 1D:
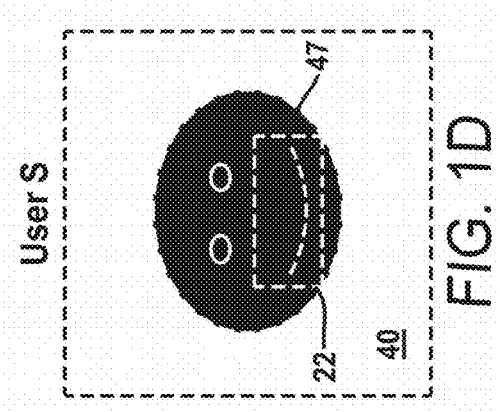
FIG. 1D is a third frame of image data collected by a camera having a third user in the camera field of view and associated with the automated speech recognition system as described herein.
Figure 1A:
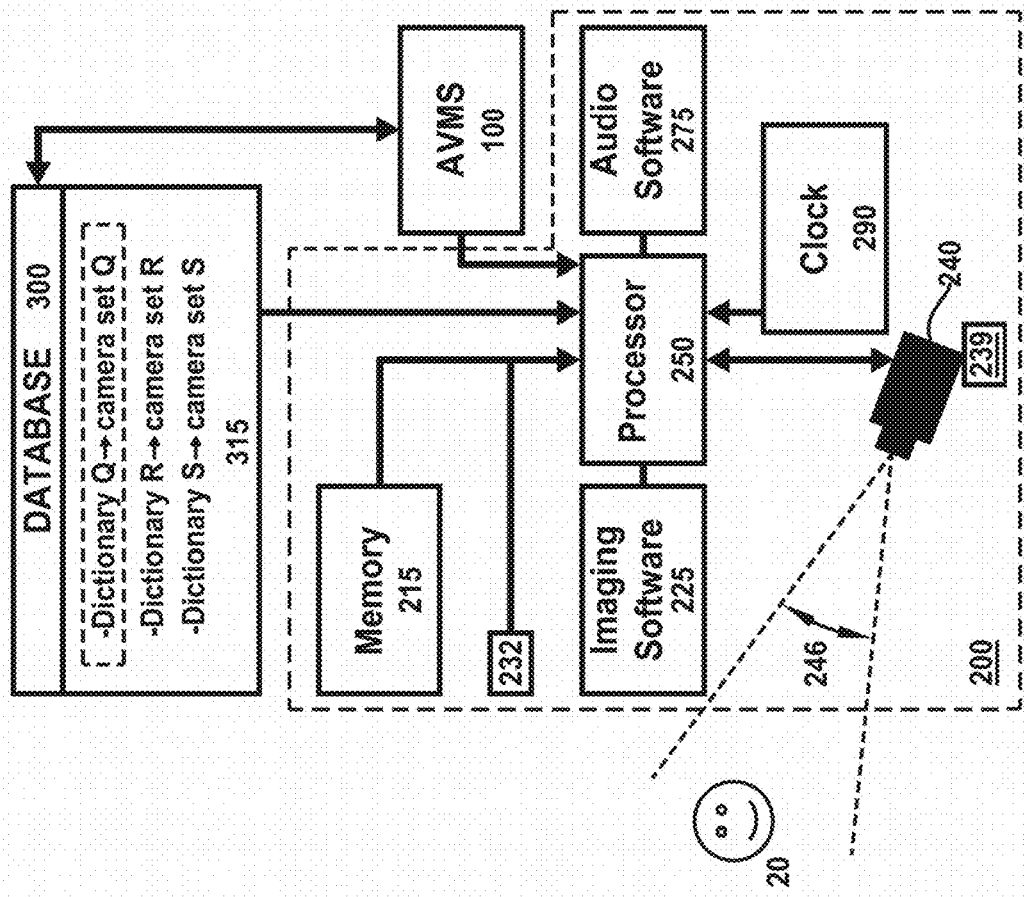
FIG. 1A is a schematic view of an automated speech recognition system as described herein.

The camera 240 includes a field of view 246 from a lens that creates image data in the form of sequential frames of digital pixel data from an image acquired within the field of view associated with the camera. In the example of FIG. 1, the field of view 246 encompasses at least a portion of a user's head and/or face, and preferably the entirety of a user's face, to create images used in image analysis software described herein. FIGS. 1B, 1C, and 1D illustrate non-limiting examples of images 20, 30, 40 taken by the camera 240 from different users Q, R, S who have entered the field of view of the camera, which may be placed inside or on a portion of a vehicle. It is notable that each of the AVMS 100 users, depicted as respective users Q-20, R-30, and S-40, have significantly different physical features, including head and face shapes, skin colors and tones, eye shape, and particularly, individualized locations of each user's mouth 27, 37, 47 in relation to the face and the camera's field of view 246. The camera 240, in conjunction with the automated speech recognition system 200 and AVMS 100 of FIG. 1, therefore, accesses the above described software instructions to complete pattern recognition and facial identification processes. This allows the camera 240 to focus the field of view 246 on a user's mouth, illustrated by the field of view patterns 22 on users' Q-20, R-30, and S-40 faces. Using facial recognition software instructions that are part of imaging software 225, along with the location of a user's mouth 27, 37, 47 within the camera's field of view 246, a system for automated speech recognition 200 has sufficient information to utilize the associated processor 250 to identify which of a selection of users/users Q-20, R-30, S-40 may be in a vehicle and ready to issue commands while driving or while being a passenger in the vehicle. The camera 240 may also include microphone 239 either installed integrally with the camera hardware or as part of a system of a plurality of microphones in data communication with the camera 240, the AVMS 100, and the automated voice recognition system 200.

As described above, one aspect of the embodiments of this disclosure includes storing user related information in a database 300 that includes a user's profile for use by the automated speech recognition system 200. In one embodiment, each user (Q-20, R-30, S-40) authorized to issue commands to a user Audio-Visual monitoring system (AVMS) 100 in a vehicle will have a profile stored in the database 300, or stored in a similar data storage architecture for recording information regarding respective users. In this embodiment, a system for automated speech recognition 200 is in communication with the AVMS 100 and includes artificial intelligence features that allow for training the automated speech recognition system 200 to recognize AVMS 100 users 15. Recognizing users includes identifying individuals in regard to physical features (e.g., height, width, head shape, facial features, and mouth location when the user is in a vehicle seat) and in regard to voice features (e.g. syntax, accents, timing of commands and dialect, pronunciation of particular words or phrases). In one embodiment, as a particular user operates a vehicle and interacts with a respective AVMS 100 and automated speech recognition system 200 associated with that vehicle, that user's profile in the database 300 is continually updated over time with repeated use. Accordingly, the user's records in the database 300 grow in content to include more and more words and phrases that can be paired with commands and instructions that the AVMS 100 has learned and successfully implemented over time. In other words, as a user pronounces certain commands, that audible command is transmitted to the AVMS 100 via the automated speech recognition system 200 described herein. The associated database entries are similarly updated such that database entries for respective users include respective audio samples (e.g., audio signals depicted as audio samples 282 at FIG. 7, 282) to be paired with that command in a computer usable format. Verification techniques are incorporated into the automated speech recognition system 200 and the connected AVMS 100 to confirm that a certain speech input 42 from a user relates to a particular command in the AVMS 100.

Automated speech recognition systems 200 described herein, therefore, have access to a database 300 and an associated dictionary 315 of commands particular to a given user or other AVMS 100 user 15. This database 300 may be stored locally in the vehicle or may be accessible from a remote server. When accessed remotely, a user's profile in the database 300 may be used in connection with more than one vehicle when each vehicle has a respective AVMS 100 in electronic communication with the remote server. In this regard, one aspect of this disclosure is a system, method, and computer program product implementing a system for automated speech recognition 200 and allowing the AVMS 100 to identify an individual user or any user of the AVMS 100 in the vehicle (e.g., passengers) while customizing aspects of the speech recognition processing for that individual.

Figure 8:
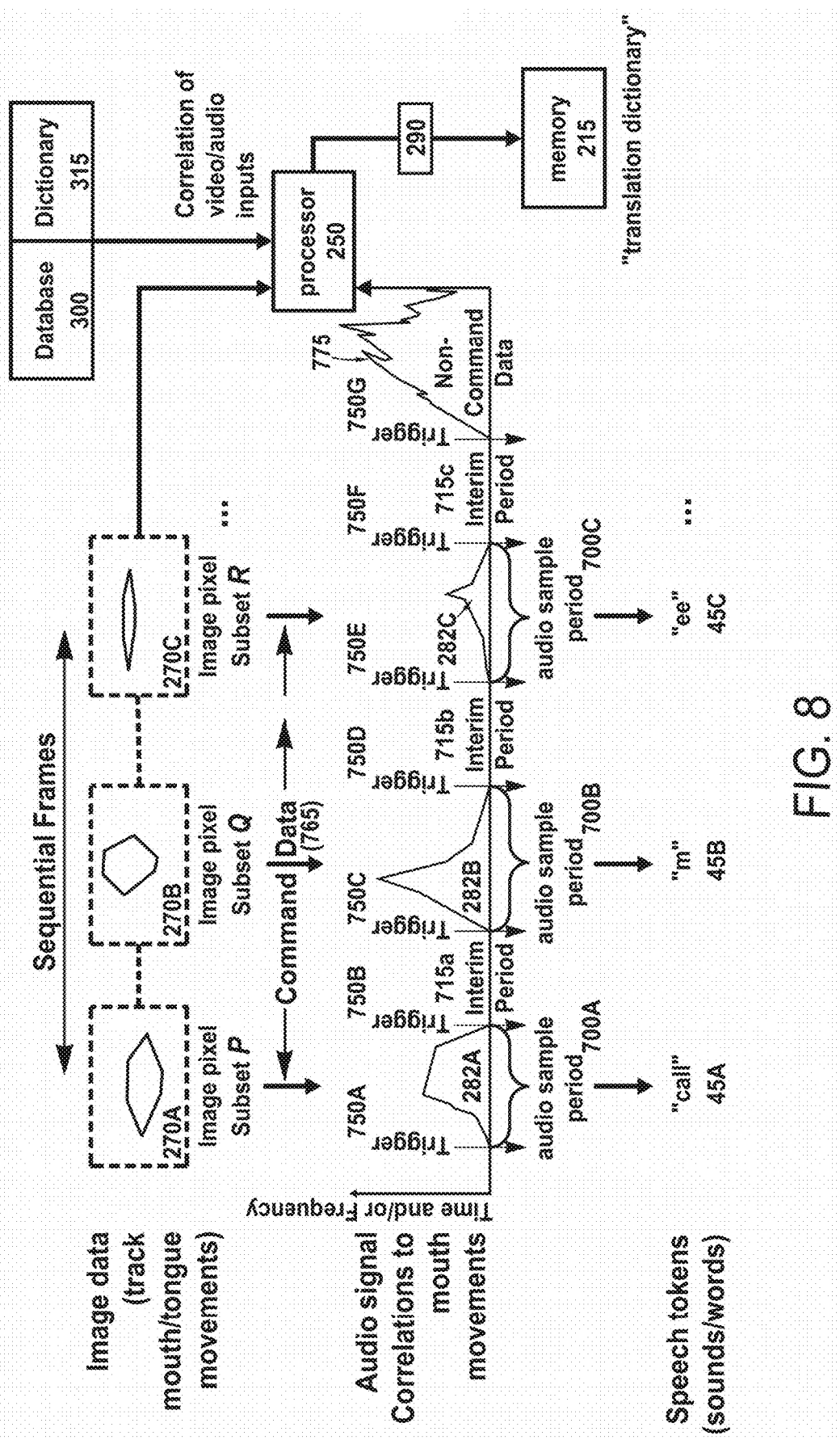
FIG. 8 is a schematic view of a signal processing method utilized by an automated speech recognition system according to FIG. 1 and including references to timing features of collected and paired frames of image data and audio data for use by the system.

As noted above, machine learning techniques are used to populate database entries with previously used audible voice tokens and thereafter derive an individual speech codec for each user profile in the database. A codec represents a mathematical model of speech elements that can be used to represent voice tokens as shown in FIG. 8, Refs. 45A, 45B, 45C (e.g. phrases, syllables, sentences) in a simple and efficient way to support speech recognition functions. Each individual person can have different accents, tones, syntax usage, and voice patterns that can be represented as a recognition model within that individual's codec. A codec, therefore, expresses mathematically modeled relationships among sounds and facial images unique to an individual in expressing a given AVMS 100 command or other speech input. In one embodiment, an individual's codec, stored in memory 215, is a data storage structure configured as a template that is subject to routine updating as an associated automated speech recognition system 200 utilizes artificial intelligence procedures to process new instances of speech inputs of voice tokens, audio samples, and command data over an extended period of use. The template, therefore, operates as a human-machine interface in the form of an updatable data storage structure. Accordingly, the memory structure of the template can be established in sectors of nonvolatile computer readable media storing voice recognition data such that the sectors are separately compressed for storage purposes. In this regard, using image and audio correlation techniques discussed below, the template may store relevant command data in a way that allows for greater speed in retrieving and decompressing at least one sector of the stored data. The automated speech recognition system 200 can decompress only those sectors necessary for a given operation. This flexibility in storing codecs in sectors according to data type allows for distributed storage of codecs in a cloud server environment.

Implementing an automated speech recognition system 200 within a respective AVMS 100 in a vehicle includes incorporating into the automated speech recognition system 200 those software and hardware attributes necessary to select a database codec and/or create a new codec to be used for a given individual through training sequences and to learn an individual's speech characteristics. The AVMS 100 is programmed to refine and improve the codec for a given user over repeated use by that individual of the automated speech recognition system 200 described herein. By identifying the individual user through the systems described herein, it is then possible to analyze statistics on an individual's speech requests (e.g., frequency of occurrence, repeated time and conditions of speech requests) and customize and/or optimize the speech recognition performance. For example, the codec can be used by the automated speech recognition system 200 to learn the most frequently used names (e.g. family members), web search requests (e.g., weather, team scores, maps, and traffic reports), or other frequently used terms for an individual, along with particular commands and requests directed to the AVMS 100. These stored requests can be prioritized in the speech recognition process. During new automated voice recognition requests, the previously stored information can be searched and utilized to learn additional language based commands directed to the AVMS 100 via an automated speech recognition system 200.

Figure 2A:
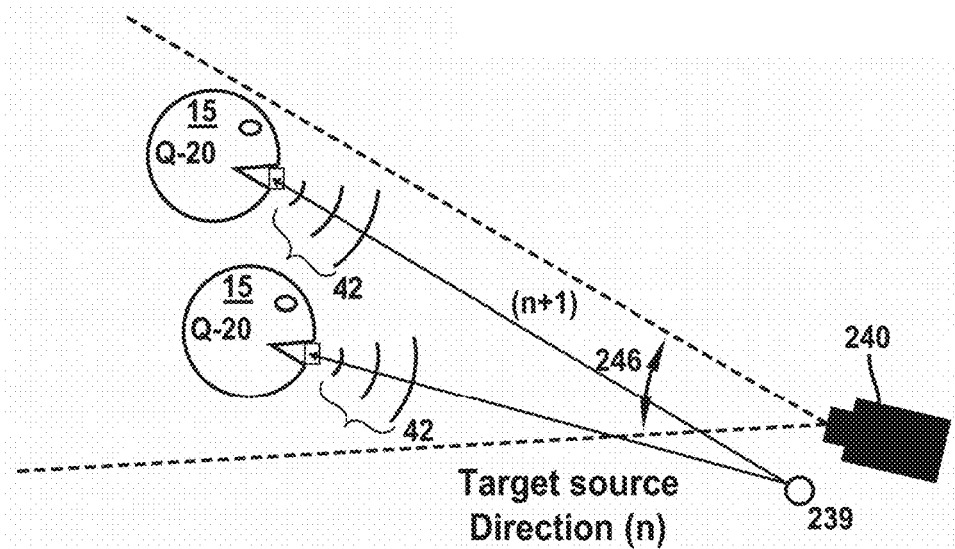
FIG. 2A is a schematic view of an adjustable camera field of view for different user positions in a vehicle utilizing an automated speech recognition system as described herein.
Figure 2B:
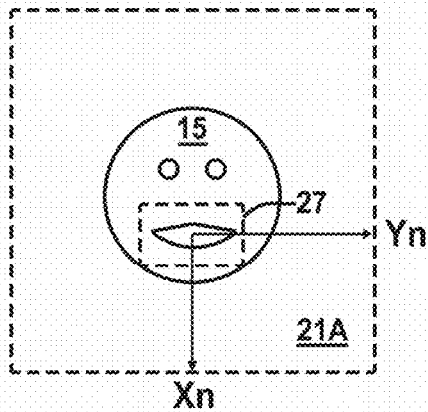
FIG. 2B is a first frame of image data from the camera of FIG. 2A and focusing on a user's mouth located at a first position in the camera field of view.
Figure 2C:
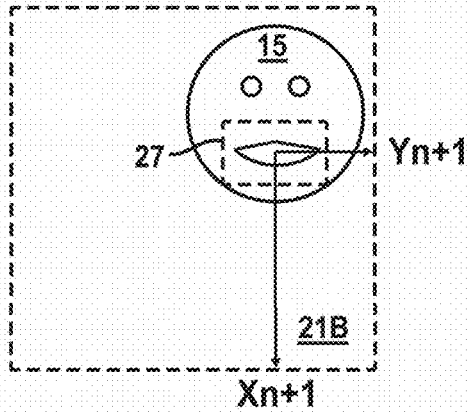
FIG. 2C is a second frame of image data from the camera of FIG. 2A and focusing on a user's mouth located at a second position in the camera field of view.

FIGS. 2A, 2B, and 2C illustrate an aspect of this disclosure by which an automated speech recognition system 200 focuses a vehicle camera field of view on a target user 15, perceived as a source of speech inputs 42 (i.e., series of audio samples 282 or voice tokens 45) within the vehicle. In one embodiment, the automated speech recognition system 200 is configured to perceive a user issuing commands to the AVMS 100. FIG. 2B illustrates a stored image of one individual 15 who has previously accessed a AVMS 100 and has a profile in the above described database 300 with records of prior use of the automated speech recognition system 200 described herein. A database profile 300 includes data previously gathered and stored for the individual shown as User Q-20 in FIG. 1. In the examples of FIG. 2A, User Q-20 is issuing an audible keyword or command as a speech input 42 from first and second positions (n, n+1) within a vehicle, the positions respectively labeled as a first position "n" and a second position "n+1" with the user of the vehicle having access to the vehicle AVMS 100 from both positions. For example, position 1 could coincide with an initial position that the user assumes in a vehicle when first entering the vehicle, and position 2 could coincide with a secondary position that has been adjusted to allow the user more comfort and accessibility (i.e., a preferred or previously stored seating position in a vehicle seat system that adjusts the vehicle seat locally). The camera 240 of FIG. 2A is in electronic communication with the AVMS 100 and, therefore, also in electronic communication with an automated speech recognition system 200 disclosed herein, which includes control systems that adjust the camera 240 and an associated field of view 246 in accordance with input from microphones 239 in the vehicle. The microphones 239, or any speech input device receiving at least one speech input 42 from the user, are connected to the automated speech recognition system 200 via signal transmission schemes that can be wired, wireless, fiber, or the like.

The automated speech recognition system 200 described in this disclosure includes software (i.e., computer readable instructions stored on non-transitory computer readable media) that may, in one non-limiting embodiment, be configured as software modules including audio processing software 275 and imaging software 225. The physical attributes of speech inputs 42 directed to the automated speech recognition system 200 can be used by the audio processing software to derive data representing the position and direction of the speech inputs 42 relative to the microphones 239. By installing multiple microphones 239 at strategic positions in the vehicle, the system may include, within the audio processing software, artificial intelligence functionality that learns and stores in memory 215 the physical characteristics for respectively received audio samples 282 derived from the speech inputs 42. For example, the amplitude and phase of the respective samples 282, divided as speech tokens 45 from the various microphones 239, along with system-stored virtual geometric mapping of the vehicle, allow the automated speech recognition system 200 to isolate the direction and geometric position in the vehicle from which a speech input 42 originated from when enunciated by the user or other user of the AVMS 100.

As shown in FIGS. 2B and 2C, the automated speech recognition system 200 operating in a AVMS environment, can be configured to utilize the speech input direction and origin data to direct the camera 240 and the camera's field of view 246 onto the respective user's (or speaker's) mouth 27, 37, 47. This determination of mouth location may be estimated from the direction of the origin of speech input data and, if available, other profile data stored in the database for this particular user/speaker. For example, the automated speech recognition system 200 may be configured to access the most likely candidates for database profiles having similar kinds of geometric origins for speech inputs. In the examples of FIGS. 2B and 2C, by using either or both of the physical profile of audio signals 282 and user profile data previously stored in the above described database 300, the automated speech recognition system 200 has access to sufficient information to identify the user identity, the user's position within the vehicle, and any relevant speech codec that can be used for speech recognition processes. This access is achieved by the system receiving information, including but not limited to, data from at least one microphone 239 operating as a speech input device 232, along with an associated camera 240, to identify a location of a user's mouth on the user's face, regardless of whether the user is sitting in the vehicle at position "n" or position "n+1." Once the camera 240 trains on the user's mouth, the images 20, 30, 40 gathered by the camera 240 can be compared by image processing software 225, accessible to the automated speech recognition system 200, to determine if the user's mouth is moving or not moving. As shown in FIG. 5, image differences in the pixels between frames 270A-270D of image data can determine a user's mouth movement and/or non-movement. Mouth movements can be used by imaging software as preliminary distinguishing criteria for assessing whether a user has issued a command or if the speech input is from another source that is not authorized for commands.

Figure 3A:
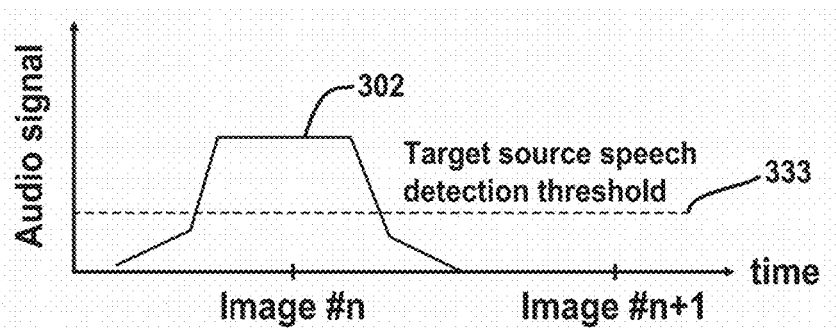
FIG. 3A is a plot of a voice token profile of an audio signal retrieved by the automated speech recognition system of FIG. 1.
Figure 3B:
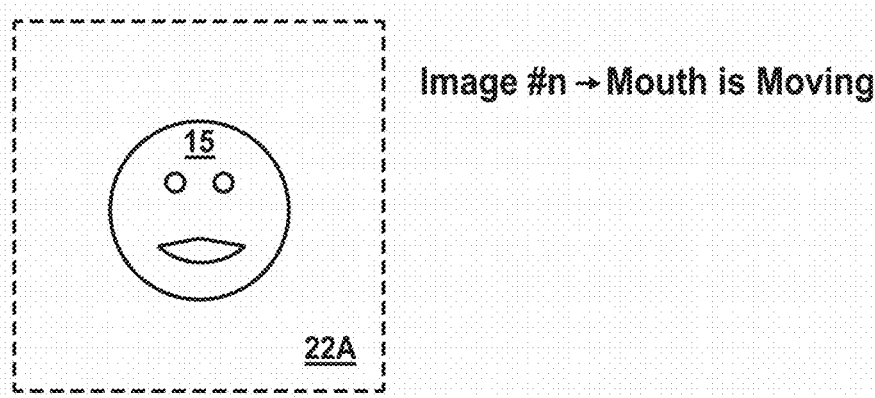
FIG. 3B is a frame of image data associated with the voice token profile of FIG. 3A and illustrating that a user's mouth is moving.
Figure 3C:
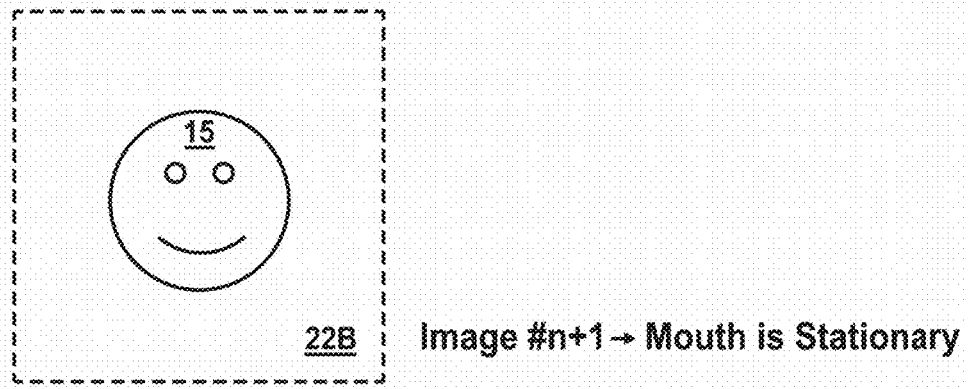
FIG. 3C is a second frame of image data associated with the voice token profile of FIG. 3A and illustrating that a user's mouth is stationary.

FIG. 3 illustrates how image sequences of a user's mouth show whether the mouth is moving or stationary. Frames 22A, 22B of image data illustrated in FIGS. 3B and 3C may be compared to corresponding sequences of audio data such as the example plot of an audio signal 302 received by various microphones 239 in the vehicle. In some embodiments, speech input signals 42, from a user/user to the automated speech recognition system 200, arrive at speech input devices 232 as parts of a sequence of speech inputs 42 retrieved by the speech input devices (e.g., the microphones 239). The automated speech recognition system 200 described herein, therefore, includes audio processing software 275 having computer implemented instructions that allow the audio processing software 275 to retrieve, store, manipulate, parse, and, overall, use incoming sound data picked up by the speech input devices 239 to engage speech recognition algorithms. The software may filter, enhance, buffer, clip, or engage in any data enhancement techniques necessary to further the purposes of the automated speech recognition system. In particular, the audio processing software 200 is configured to utilize numerous audio signals to determine valid speech inputs to the speech recognition processes described herein, and more particularly to identify voice tokens 45 (i.e., snippets of voice data) associated with critical sounds, portions of words, or phrases that allow voice recognition to be efficiently completed.

The plot of FIG. 3A illustrates an example audio signal profile for a portion of a sequence of audio signals that the system of this disclosure correlates to corresponding frames of image data 270 that is acted upon by imaging software 225 and recognizes that a mouth is moving and that the amplitude of the audio signal 302 has characteristics indicative of the user producing the speech input 42. At image "n+1" of FIG. 3C, the user's mouth is not moving, and the corresponding plot of the audio signal confirms that a speech input has not been detected. FIG. 3, therefore, illustrates that images from the camera 240, accessed on a frame by frame basis 22A, 22B, may be paired with corresponding plots of audio signals 302 parsed from a series of speech inputs 42 received by the AVMS. For those portions of the audio signal meeting an amplitude threshold 333 (considered to be the minimum level that could possibly be a user command), the system described herein pairs the portions of the audio signal 282 with corresponding images from the camera 240 to confirm that a user has issued a speech input 42. With the user's mouth moving at the same time, this speech input 42 is a likely candidate for being a AVMS command from the user requiring further processing by an automatic speech recognition system 200. It is notable that this detailed description of the various embodiments herein includes pairing the audio sample portions 282 with corresponding frames 21A, 21B, 22A, 22B of image data in a time domain plot. This example does not, however, limit the system and method described herein to any particular coordinate systems for plotting the pairing operations. Numerous other digital signal analysis methods are available to compare traits of an audio signal with corresponding images and pair them accordingly; thus, the example of FIG. 3 is not limiting of the signal processing techniques available to compare the image data and audio data as described herein.

FIG. 4 illustrates yet another aspect of data collection useful in the apparatuses, methods and systems described herein. Pursuant to FIG. 4, a camera 240 mounted on and/or inside of a vehicle has a field of view 246, preferably a field of view 246 that is adjustable by the AVMS 100 and/or the automated speech recognition system 200. The AVMS 100 and/or speech recognition system 200 are operable to change the camera settings, including but not limited to shutter speed, frame rate, resolution, color control, focus and lens settings, depth of the field of view, field of view angle, focal length, and working distance. As discussed above, certain camera settings are controlled by software, programmed in non-transitory computer readable media that are component parts of the camera and/or the AVMS, and the AVMS utilizes the above described microphone arrangements in the vehicle to identify a location and potential identity of a source of speech inputs. After identifying the location and possible identity of a source of speech inputs, the best camera settings are configured to locate and provide images of the source's head, face, and particularly, the source's mouth.

In FIG. 4, the camera settings are configured to provide image data 270, on a frame by frame basis, of a source of audio signal 282 in a vehicle. Each of FIGS. 4A-4D illustrate the camera 240 retrieving and processing image data 270 for use by the automated speech recognition system 200 and the AVMS 100 to confirm that a speech input 4 (i.e., an audio signal or voice token) received at an associated microphone 239 or set of microphones is accurately identified as a command for the AVMS. In the example embodiments of FIG. 4, the camera 240 generates image data 270 from a field of view 246 capturing an image of a vehicle user as a source of a speech input 42. FIG. 4A illustrates a first position of a user's head, face, and mouth within the camera's field of view. In this example, the camera 240 generates image data 270 in which the user's face is turned slightly to the user's right side. In one embodiment, the degree to which the user's head and face are turned, either left or right from the user's perspective, is a data point in the decision-making process for the automated speech recognition system and/or the AVMS to assess whether a speech input is a valid command that should be considered for the AVMS to use in taking action within the vehicle's array of vehicle systems installed on the vehicle.

In other words, images of the user's head and face positions can be used by the software of the automated speech recognition system to determine a degree of rotation of the head, face, and/or mouth relative to a three-dimensional coordinate system. In one example, the three-dimensional coordinate system includes x and y axes in a horizontal plane relative to the vehicle floor and a z axis in a vertical plane relative to the vehicle floor. These x, y, and z axes establish a Cartesian coordinate system centered about a point of origin, theoretically positioned inside the user's head. In a data and image processing sense, the three-dimensional coordinate system on which the user's head is mapped, within the software and systems described herein, can be used to determine if the user is issuing command data as shown in FIG. 4. In one example, an optimal head position for identifying an utterance, or speech input 42, as including command data, is a head position with the face directed straight ahead and with the eyes in position to be "on the road" in front of the user. FIG. 4B illustrates this position in which the speech recognition system utilizes at least one microphone as a speech input device (not shown), a camera providing image data of the user's head, face, and/or mouth, and the automated speech recognition system assimilating the data from these components. The AVMS, therefore, can assess both the content and the validity of potential command data within the speech input to the microphone(s). In one embodiment, a degree of angular rotation for a user's face and mouth, relative to the above described Cartesian coordinates, can be used to determine if the user's head, face, and mouth are likely in positions that are expected when a user issues a AVMS command. By comparison, FIG. 4C and FIG. 4D illustrate head, face and mouth rotations that are likely to be outside of a threshold (i.e., an angle or degree of head rotation) for the AVMS to consider utterances paired with these images to be command data. The system may be configured with a tolerance for varying angles of a user's head, face, and mouth relative to the camera field of view 246 such that speech input signals may be considered likely candidates for including command data so long as collected frames of image data show that head, face and mouth angles are within the prescribed tolerance, such as that illustrated in FIG. 4A.

Figure 5A:
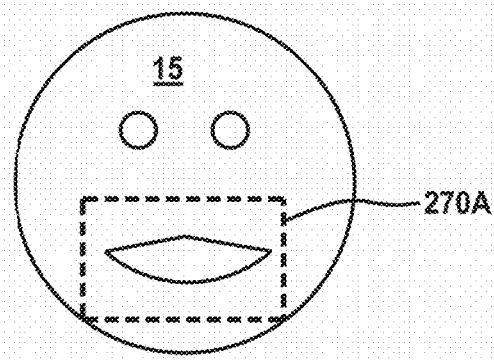
FIG. 5A is a schematic view of a first frame of image data collected by a camera having a focus on a user's mouth in a vehicle utilizing the automated speech recognition system of FIG. 1A.
Figure 5B:
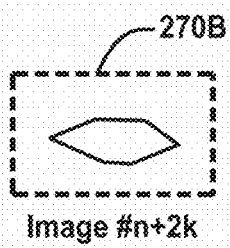
FIG. 5B is a parsed portion of the image data of FIG. 5A illustrating an image of a user's mouth enunciating a voice token with the user's mouth in a first position.
Figure 5C:
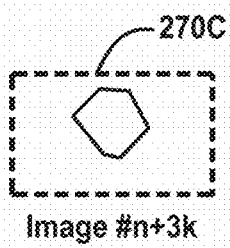
FIG. 5C is a parsed portion of the image data of FIG. 5A illustrating an image of a user's mouth enunciating a second voice token with the user's mouth in a second position.
Figure 5D:
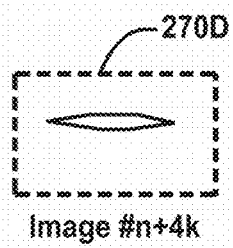
FIG. 5D is a parsed portion of the image data of FIG. 5A illustrating an image of a user's mouth enunciating a third voice token with the user's mouth in a third position.
Figure 5E:
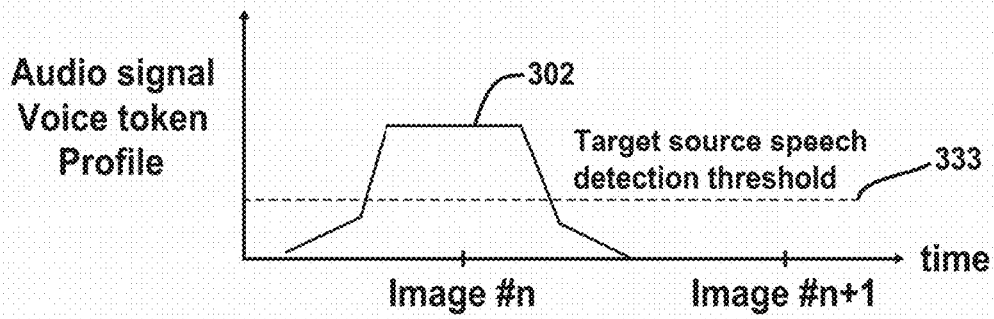
FIG. 5E is a plot of a voice token profile of an audio signal retrieved by the automated speech recognition system of FIG. 1 and available for matching with image data of FIGS. 5A-5D.
Figure 5F:
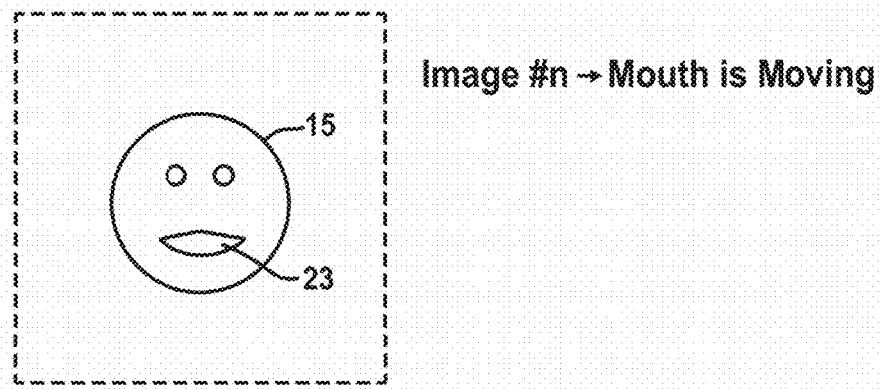
FIG. 5F is a second frame of image data used in conjunction with the automated speech recognition system of FIG. 1 and providing a second view of the user's mouth in the camera field of view.

The apparatuses, systems, and methods of this disclosure include additional hardware and software modules that parse portions image data 270 within single frames for further analysis. FIG. 5A illustrates an example frame of image data 270 in which the camera installed within a vehicle has focused its settings on a user's mouth as a source of an utterance that may be a command to the AVMS. Each frame of image data provided by the camera 240 can be analyzed to determine the pixel configuration representing the user, or more particularly, the user's mouth as a source of a AVMS command. In FIGS. 5B, 5C, and 5D, the user's mouth has been isolated in respective sets of mouth pixels provided by the camera 240. Image analysis and lip-reading software, either installed on or remotely available to a AVMS 100, may be equipped to identify a likely sound or phonetic output resulting from a particular mouth shape. Placing these mouth shapes in sequence configures the AVMS 100 to decipher a likely command that the user has issued as an audible signal. As described above, machine learning techniques may be implemented in the AVMS 100 to derive entries to the database 300 of series of audio signals and thereby program an individual speech codec for each user profile in the database 300. A codec represents a mathematical model of speech elements that can be used to represent audio signals 282 or voice tokens 45 (e.g. phrases, syllables, sentences) in a simple and efficient way to support speech recognition functions. Each individual person can have different accents, tones, syntax usage, and voice patterns that can be represented in that individual's codec. As illustrated in FIG. 5, part of this database 300 and codec implementation is the gathering of respective mouth locations, mouth shapes, and facial expressions that can be parsed from image data and saved to a user's profile. The user's codec, therefore, may include data and models of how each respective AVMS user manipulates their face, mouth, tongue, lips, and associated head muscle formations to speak a command. As the automated speech recognition software shares more and more phonetic entries into a database and allows for progressively more detailed, sophisticated, and correspondingly more accurate codecs for each user, the automated speech recognition system is trained to decipher language uttered as command data from available speech inputs, head rotation analysis, and image data of at least user's mouth.

Figure 6:
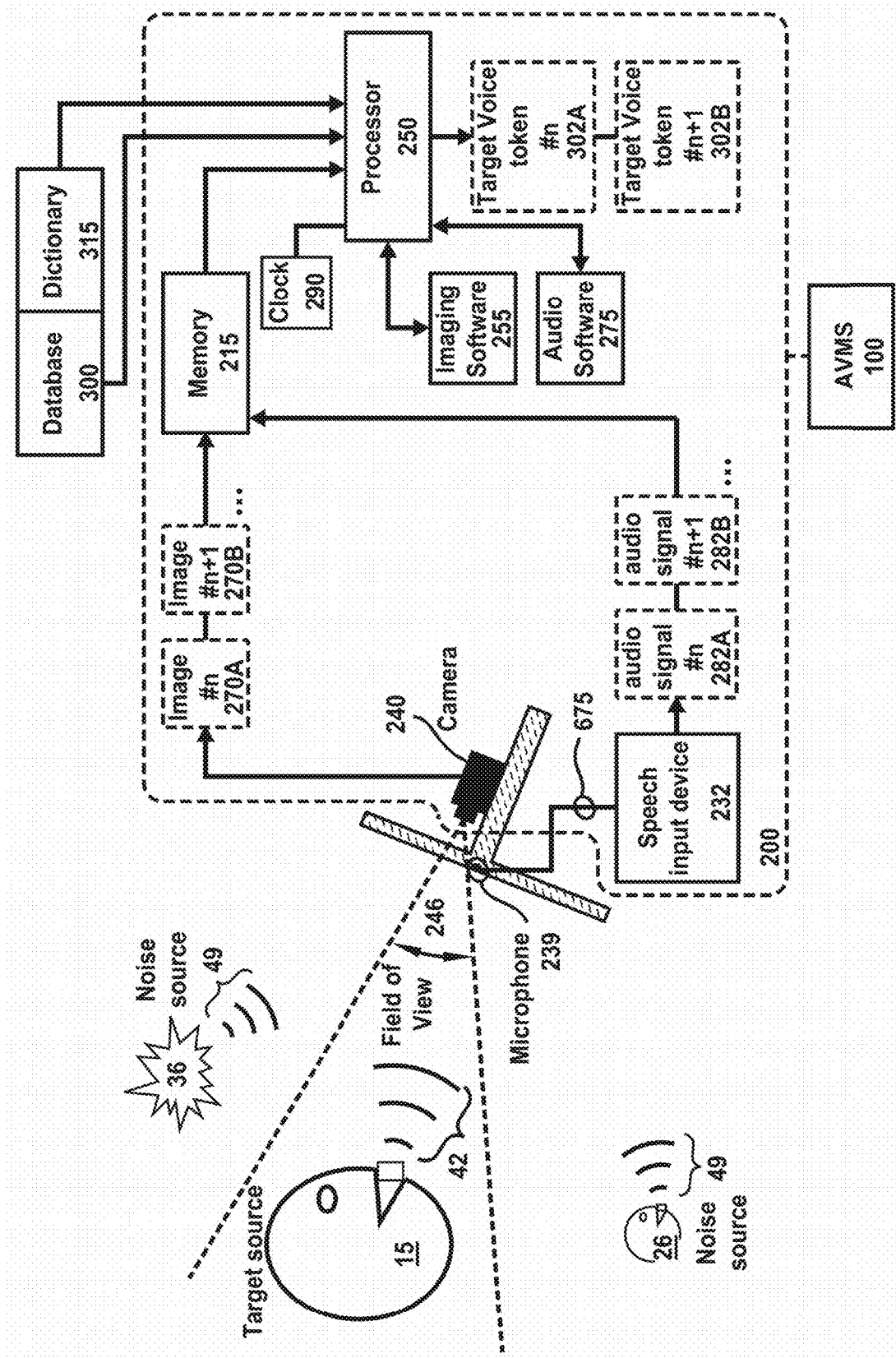
FIG. 6 is a schematic view of an automated speech recognition system according to FIG. 1 and including references to collected and paired frames of image data and audio data for use by the system.

FIG. 6 illustrates one example of a global implementation of a system architecture for automated speech recognition system 200 according to the embodiments described herein. A user 15 in a vehicle is identified as a target source of at least one speech input 42 in the form of an audible voice signal 675. Portions of audio samples 282 considered by the system of this disclosure include voice tokens 45, which are snippets from a string of audio signals that may be identified as a finite component of a single command. FIG. 6 illustrates that other sounds 49 within the pick-up range of the system may be noise sources 26, 36 in that these secondary audio sources 26, 36 affect corresponding speech input signals 42 but are preferably excluded from analysis because noise sources 26, 36 do not include command data that is useful to the AVMS 100 or peripheral components.

The system includes a speech input device 232 configured to convert speech inputs 42 to an electronic signal 675, in either digital or analog format, for further processing. In the example of FIG. 6, the speech input device 232 is a microphone 239. Other implementations may include multiple microphones 239 arranged in an array or arranged in disparate locations throughout a vehicle. As described above, the geographic locations of the speech input devices 232 within a vehicle, along with the physical attributes of the electronic signals 675 received from each, allow the AVMS 100 to identify a direction and location within the vehicle from which an audio sample 282 has originated. In this way, the system allows for preliminary screening of speech inputs 42 as originating from the desirable target source or a peripheral noise source.

Figure 7:
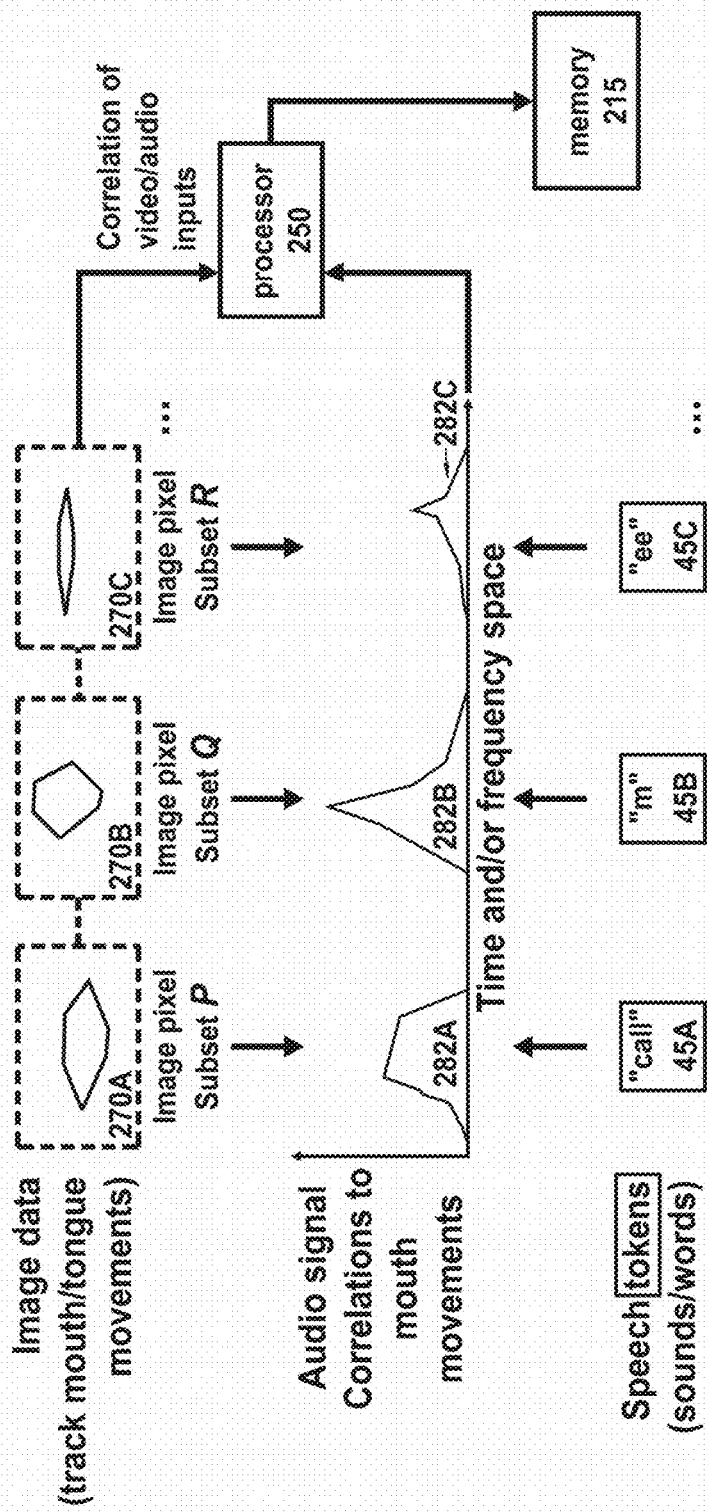
FIG. 7 is a schematic view of a signal processing method utilized by an automated speech recognition system according to FIG. 1 and including references to collected and paired frames of image data and audio data for use by the system.

In accordance with FIGS. 6 and 7, in one embodiment, a system for automated speech recognition 200 accesses computer memory 215 and a processor 250 executes at least imaging software 225 and audio processing software 275. The processor 250 is configured to pair up portions of a sequence of audio signals 282 with portions of an overall collection of frames 21A, 21B, 22A, 22B of image data gathered by the respective speech input device 232 and camera 240. The above described operations on both the audio signal and the image data confer abilities to the AVMS including identifying a location of a source of speech inputs 42, divided into speech tokens 45, and determining if image data 270A, 270B verifies that a given speech input 42, or voice token 45, is likely a keyword phrase or command from an authorized user or vehicle user. The determination of the presence of a keyword phrase or command data is further accommodated by the automated speech recognition system 200 accessing codecs having models of different aspects of speech and language patterns for individual users/users as described above. The codecs and other database entries accessible as profiles for a given set of users/users can be utilized to provide enhanced machine translations and lip-reading procedures operated upon either or both of the audio signals and the image data described herein.

FIG. 7 illustrates examples of signal processing steps that are available via a processor 250 and non-transitory computer readable memory 215 connected to the above described database 300 and translation dictionary 315, either locally or remotely. As set forth in FIG. 7, parsed frames of image data 270A, 270B, 270C from the camera 240 of FIG. 6 are isolated to identify individual shapes of a user's lips and mouth during enunciation of particular speech inputs 42 which are converted to audio samples 282A, 282B, 282C, and may be further parsed into voice tokens 45A, 45B, 45C, such as parts of a word or phrase. Similar to the system of FIG. 3, voice tokens 45A-45C from the overall audio sample 282 retrieved by a speech input device 232, such as at least one microphone 239, are similarly parsed from the audio signal and plotted in either time or frequency space as shown. The system 200 of this disclosure, in association with a vehicle AVMS 100, can utilize the images as shown, along with corresponding voice tokens 45 similarly examined in the same time or frequency domain, and confirm certain sounds and words form speech input using this data.

FIG. 8 illustrates one or more example of a signal processing procedure by which paired audio and image data of FIG. 7 can be used, along with selected codecs from user profiles stored in the above described database 300 of voice recognition and lip-reading profiles. In addition to pairing mouth image pixel data frames, shown in FIG. 8 as sequential image data frames 270A, 270B, 270C with corresponding audio samples 282A, 282B, 282C, one non-limiting signal processing technique matches paired audio signals 282A, 282B, 282C with the image data frames 270A, 270B, 270C, with corresponding voice tokens 45A, 45B, 45C. The system described herein also includes the capacity to utilize the audio sample length times 700 of a sequential set of audio samples 282A, 282B, 282C representing corresponding voice tokens 45A, 45B, 45C. These data sets are tracked along with the interim period times 715 between audio samples 282A, 282B, 282C to further assess the presence or lack of a keyword phrase or command data in a respective audio signal data stream. The plot of voice tokens 45A, 45B, 45C in a time or frequency space as shown in FIG. 7 can be described as a series of trigger points 750 in which the speech input device provides a sufficient electronic signal, derived from raw audio, that the automated speech recognition system can detect start and stop points for a series of audio segments within the audio sample. In FIG. 7 and FIG. 8, each audio segment, or voice token 45, has an identifiable start trigger 750A, 750C, 750E and stop trigger 750B, 750D, 750F as determined by the audio sample 282A, 282B, 282C crossing a zero axis in the domain selected for plotting. In the time domain, for example, an associated clock 290 measures the time between a start trigger and a stop trigger for a given voice token 45 and that measurement may be referred to herein as an audio sample length time 700. The time between a first stop trigger and a succeeding start trigger for consecutive voice tokens is considered an interim period length 715A, 715B, 715C. The system, method, and computer program product described in this disclosure are configured to utilize the audio sample lengths and the interim period lengths as additional data points in an overall verification and speech translation of a voice command to the AVMS.

In the example of FIG. 8, a user/user can train the system by providing a series of keyword phrases or commands in audible format for processing. This training may also include the use of an electromechanical switch to indicate the start or stop of a training request. The processor 250, memory 215, and database 300 use these example keyword phrases or commands to update a user's profile in the database, and that user's corresponding codec will be available with a model of the user's speech patterns and linguistic profile. In a global sense, identifying the length of expected interim periods 715 and sample lengths 700 likely for command data signals 765 from a given user/user provides at least a first level of screening for command data as opposed to audio received at the speech input device due to noise sources that are non-command data 775. As shown in one non-limiting example, noise sources 26, 36 such as general conversation in the vehicle or on the telephone, are not as likely to have the same start trigger 750A and stop trigger 750B as command data 765 in which the user is more intentional for clarity in enunciation. The interim periods and the audio sample times for known keyword phrases or command data can be modeled in a user's codec for the system to more quickly assess the identity of the user/user and the profile data necessary to implement new machine translations of voice tokens 45 from audio samples 282 and lip reading from image data 270.

Considering the above described figures and features, this disclosure describes an overall system for automated speech recognition that can be implemented in software that is programmed as a series of computer implemented instructions and modules stored on non-transitory computer readable media to implement an associated method and/or a computer program product. The system includes computer memory 215, a processor 250, system clocks 290, and the above noted computer implemented instructions stored in either a local memory or accessed remotely over a network in a distributed system of clients and servers. The processor 250 may be one of several AVMS processors that executes imaging software 225 and audio processing software 275 for communicating corresponding data to the AVMS or another processor in a different system. The automated speech recognition system 200 of this disclosure includes a camera 240 transmitting a plurality of sequential frames of digital pixel data from an image acquired within a field of view 246 associated with the camera 240. A speech input device 232, such as a microphone 239, transmits to the audio processing software 275 an audio data stream of voice tokens 302 derived from at least one speech input from the user/user. At least one clock/timer 290 is configured to transmit to the computer memory elapsed time values as measured in response to receiving and/or identifying respective start triggers and stop triggers associated with segments of the audio data stream. The audio processing software 275 is programmed to assert and de-assert appropriate switches, whether in hardware or software, to provide timer 290 that measure respective audio sample times 700 and interim period times 715 between the audio samples. In some embodiments, the audio samples are the above described voice tokens 45 that have been parsed from at least one speech input 42. As part of the above described speech and keyword phrase and command recognition from inside a vehicle, the audio processing software 275 is further configured to compare interim period times 715 with a command spacing time value constant corresponding to an expected interim time value between commands in a valid command data set. Tracking the interim periods during known command audio signal transmission is one aspect of training a speech recognition system to identify a voice token as either a keyword phrase or command or a portion of a keyword phrase or command.

Upon identifying features of both the above described image data and the audio data, the system is configured to screen for audio and image data that is clearly outside the bounds of command data that is useful to the AVMS 100. Potentially valid keyword phrase and command data is maintained for further processing in memory and/or buffer structures in a computer, while invalid samples are discarded. In one configuration, the system analyzes previously paired mouth image data with voice tokens to confirm whether or not a user's mouth was moving during the time that the speech input device gathered audio data from the immediate surroundings. For periods when the image data indicates that a user's mouth is not moving, the corresponding audio samples, or voice tokens, paired in the time domain with the images, can be discarded as invalid. Similarly, the system further utilizes the processor and memory to store an amplitude threshold value for audio signals deemed possible commands to the AVMS 100. Amplitudes of audio signals and individual voice tokens that exceed an established threshold may be further considered for translating into a useful format as a command to the AVMS 100. The computer software implemented as the system and method of this disclosure may be arranged in numerous different modules such as audio signal processing software 275, image data processing software 225, and command processing software that ensures proper instructions are sent to the AVMS for action.

Figure 9:
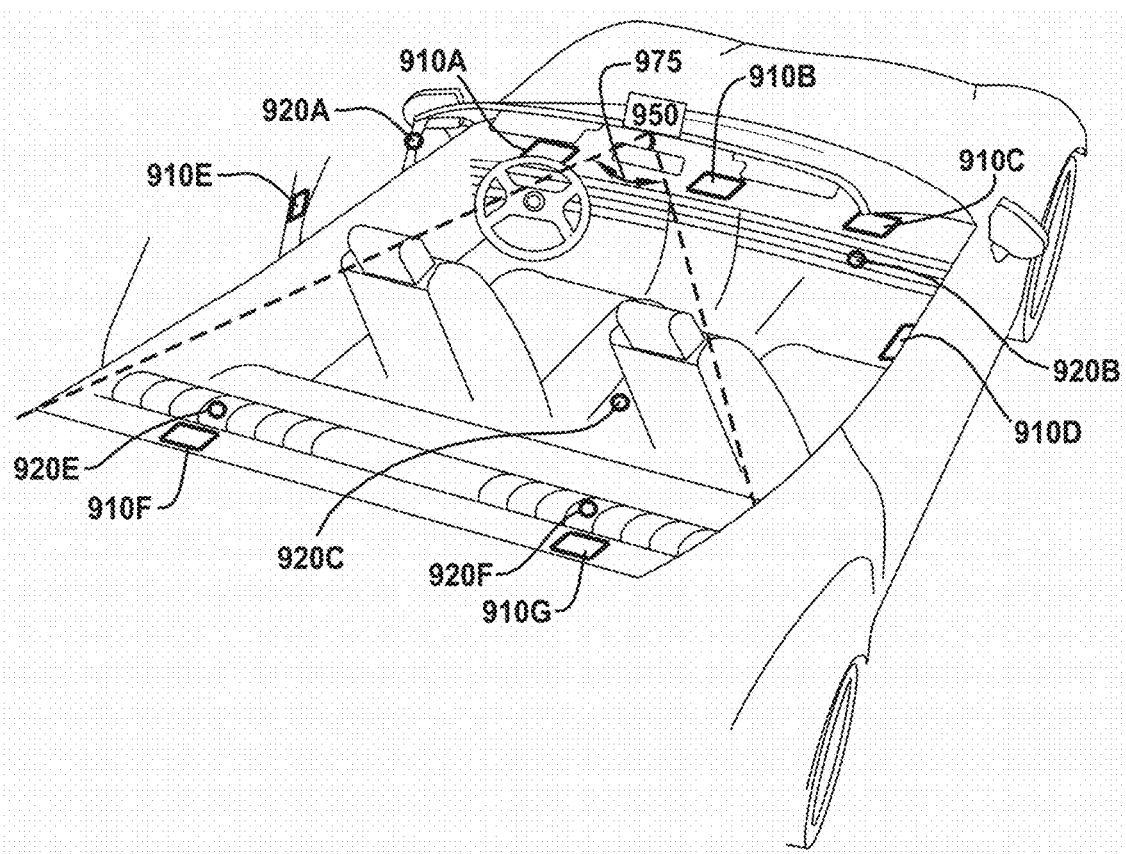
FIG. 9 is a perspective view of a system of image detection devices and speech input devices positioned for data collection across the entirety of a vehicle cabin as described herein.

In another embodiment exemplified by FIGS. 8 and 9, systems according to this disclosure utilize the above noted components and computerized methods to distinguish command data from an authorized user from non-command data originating from a different individual in the vehicle. In additional embodiments, the system is configured to distinguish speech inputs 42 from individuals from that of noise sources 26, 36. The audio signal processing techniques described above encompass systems that record physical features, positions, voice prints, and other identifying criteria, store this recorded data in memory 215, and assess whether a given speech input 42 is from an authorized user 15, that user's position in the vehicle, and the kinds of commands that user 15 is authorized to issue to the AVMS 100. By tracking mouth movements, physical positions, body measurements, direction of audio signals, the strength of audio signals at different microphones, and other parameters within the scope of this disclosure, the AVMS may correlate a given individual with a particular record in the database 300 and track appropriate pre-set authorizations for valid commands that each user 15 may issue. For example, while a driver may issue commands that control vehicle operation, other passengers in other parts of the vehicle may be identified and, according to their respective positions in the vehicle, may issue commands for certain accessories available in the vehicle cabin. Individuals such as children may be unauthorized to issue any command data at all. Each of these authorizations may be pre-programmed in computer readable memory and assigned to each user 15 in an ad-hoc fashion upon entering the vehicle.

In accordance with multiple user access to the AVMS 100, embodiments described herein further include system components configurable to track, identify, and control commands 765 from users in various positions within the vehicle. In addition to utilizing multiple speech input devices 232 positioned throughout the interior of a vehicle, this disclosure incorporates the use of image detectors and sensors 950 illustrated in FIG. 9 as having a field of view 975 that covers wide areas up to and including an entire vehicle interior, individual seats, front seat areas and floor wells, back seat areas and floor wells, and the like. In other embodiments, by positioning cameras 910A-910G and other image sensors having more precise fields of view for particular targets throughout the vehicle, along with strategically placed speech input devices 920A-920F and/or recorders, transceivers, and the like, the AVMS is configured to utilize all appropriate signal propagation and signal analysis techniques to discern an origin of a particular speech input. These techniques include, but are not limited to, beam forming techniques from hardware making up wireless communication systems in the vehicle. For example, antenna arrays use adaptive beam forming to enhance and reject appropriate audio signals originating in the vehicle. Signal processing techniques that are useful in designing layouts for antenna arrays are applicable to the AVMS as described herein for identifying an origin of speech inputs 42.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Referring to FIGS. 6-9, embodiments of the methods and systems are described herein with reference to block diagrams and flowchart illustrations of methods, systems, apparatuses and computer program products. It will be understood that each block of the block diagram and flowchart illustration can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagram and flowchart illustration support combinations of means for performing the specified functions, combinations of steps for performing the specified functions and program instruction means for performing the specified functions. It will also be understood that each block of the block diagram and flowchart illustration, and combinations of blocks in the block diagram and flowchart illustration, can be implemented by special purpose hardware-based computer systems that perform the specified functions or steps, or combinations of special purpose hardware and computer instructions.

Described herein are embodiments of a computer readable medium used to support reservoir pressure prediction. The figures present an overview of an embodiment of a computer readable medium for use with the methods disclosed herein. Results can be delivered to a gateway (remote computer via the Internet or satellite) for in graphical user interface format. The described system can be used with an algorithm, such as those disclosed herein.

As may be understood from the figures, in this implementation, the computer may include a processing unit 106 that communicates with other elements. Also included in the computer readable medium may be an output device and an input device for receiving and displaying data. This display device/input device may be, for example, a keyboard or pointing device that is used in combination with a monitor. The computer system may further include at least one storage device, such as a hard disk drive, a floppy disk drive, a CD Rom drive, SD disk, optical disk drive, or the like for storing information on various computer-readable media, such as a hard disk, a removable magnetic disk, or a CD-ROM disk. As will be appreciated by one of ordinary skill in the art, each of these storage devices may be connected to the system bus by an appropriate interface. The storage devices and their associated computer-readable media may provide nonvolatile storage. It is important to note that the computer described above could be replaced by any other type of computer in the art. Such media include, for example, magnetic cassettes, flash memory cards and digital video disks.

Further comprising an embodiment of the system can be a network interface controller. One skilled in the art will appreciate that the systems and methods disclosed herein can be implemented via a gateway that comprises a general-purpose computing device in the form of a computing device or computer.

One or more of several possible types of bus structures can be used as well, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems, including the processor, a mass storage device, an operating system, network interface controller, Input/Output Interface, and a display device, can be contained within one or more remote computing devices at physically separate locations, connected through buses of this form, in effect implementing a fully distributed system.

The computer typically comprises a variety of computer readable media. Exemplary readable media can be any available media that is accessible by the computer and comprises, for example and not meant to be limiting, both volatile and non-volatile media, removable and non-removable media. The system memory comprises computer readable media in the form of volatile memory, such as random access memory (RAM), and/or non-volatile memory, such as read only memory (ROM).

In another aspect, the computer 102 can also comprise other removable/non-removable, volatile/non-volatile computer storage media. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device, including by way of example, an operating system and computational software. Each of the operating system and computational software (or some combination thereof) can comprise elements of the programming and the computational software. Data can also be stored on the mass storage device. Data can also be stored in any of one or more databases known in the art. Examples of such databases comprise, DB2™, MICROSOFT™ ACCESS, MICROSOFT™ SQL Server, ORACLE™, mySQL, PostgreSQL, and the like. The databases can be centralized or distributed across multiple systems.

In another aspect, the user can enter commands and information into the computer 102 via an input device. Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit via a human machine interface that is coupled to the network interface controller, but can be connected by other interface and bus structures, such as a parallel port, game port, an IEEE 1394 Port (also known as a Firewire port), a serial port, or a universal serial bus (USB).

In yet another aspect, a display device can also be connected to the system bus via an interface, such as a display adapter. It is contemplated that the computer can have more than one display adapter and the computer can have more than one display device. For example, a display device can be a monitor, an LCD (Liquid Crystal Display), or a projector. In addition to the display device, other output peripheral devices can comprise components such as speakers and a printer which can be connected to the computer via Input/Output Interface. Any step and/or result of the methods can be output in any form to an output device. Such output can be any form of visual representation, including, but not limited to, textual, graphical, animation, audio, tactile, and the like.

The computer 102 can operate in a networked environment. By way of example, a remote computing device can be a personal computer, portable computer, a server, a router, a network computer, a peer device, sensor node, or other common network node, and so on. Logical connections between the computer and a remote computing device can be made via a local area network (LAN), a general wide area network (WAN), or any other form of a network. Such network connections can be through a network adapter. A network adapter can be implemented in both wired and wireless environments. Such networking environments are conventional and commonplace in offices, enterprise-wide computer networks, intranets, and other networks such as the Internet.

Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems described herein can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The embodiments of the method, system and computer program product described herein are further set forth in the claims below.

The invention claimed is:

1. A system for monitoring an area within a vehicle comprising: computer memory; a processor executing imaging software and audio processing software; an imaging device transmitting to said imaging software a plurality of frames of pixel data from an image acquired from a field of view within the vehicle and associated with the imaging device; a speech input device transmitting to said audio processing software an audio data stream of audio samples derived from at least one speech input; command processing software configured to (i) track said audio samples in a time domain; iii) track said frames of pixel data in said time domain and utilize said processor and said computer memory to group, in said time domain, said frames of pixel data with correspondingly timed audio samples; wherein the processor is configured to identify a source of the audio data stream from the frames of pixel data and the audio samples and to identify at least one command issued by the source; and a database of authorization data for matching said at least one command to the authorization data to determine whether the source of the audio data stream has permission to issue the command.

2. A system according to claim 1, wherein said imaging software is configured to compare consecutive frames of pixel data and determine image differences between said consecutive frames, wherein said speech input originates from a user's mouth and said image differences comprise pixel differences in said frames that determine a user's mouth movement and/or non-movement.

3. A system according to claim 2, wherein said speech input originates from a user's mouth and said image differences comprise pixel differences in said frames that determine a user's mouth movement and/or non-movement.

4. A system according to claim 3, wherein said processor accesses command processing software stored in the computer memory and calculates a physical position of the mouth relative to the field of view of the imaging device from a virtual position of the mouth represented by a subset of the pixel data.

5. A system according to claim 4, wherein said virtual positions of the mouth validate the presence of command data in said speech input.

6. A system according to claim 4, wherein said virtual positions of the mouth validate that the mouth is moving during said audio data stream of audio samples and/or not moving during an interim period.

7. A system according to claim 4, wherein said command processing software identifies a plurality of frames of pixel data representing respective virtual positions of the mouth that are grouped with at least one valid audio sample and compares said image differences among the plurality of frames to decipher a command from the user's mouth movement.

8. A system according to claim 1 wherein said memory comprises a translator dictionary matching a sequence of mouth movements represented by subsets of said digital pixel data to spoken utterances represented by portions of said audio samples.

9. A system according to claim 1 wherein the processor utilizes the source of the speech input to authenticate a command in the spoken utterance.

10. A system according to claim 1 wherein the source of the speech input is a human head that is further validated by the processor evaluating the pixel data to identify a direction of angular rotation of the human head of as the source of the speech input.

11. A system of data acquisition for automated speech recognition comprising: computer memory; a processor executing imaging software, audio processing software, command processing software and codec software; a camera transmitting, to said memory, a plurality of frames of digital pixel data from an image acquired within a field of view associated with the camera; a speech input device transmitting, to said memory, a set of digital audio data streams derived from respective speech inputs; wherein said imaging software isolates, from said frames of digital pixel data, a subset of pixels representing a source of the speech input; and wherein said processor generates a voice token profile for the respective sets of digital audio samples based on said subset of pixels representing the source of speech input; wherein said processor stores in said database each respective speech profile, filters the database for identified speech profiles associated with individual users, and stores the identified speech profiles as respective codecs for respective individuals.

12. The system of data acquisition for automated speech recognition of claim 11, wherein the codec comprises models of a user's mouth movements, tongue movements, and head movements that produce a phonetic sound detected by the system.

13. The system of data acquisition for automated speech recognition of claim 12, wherein the codec is progressively trained by use over time.

14. A system according to claim 1, further comprising a database of voice tokens stored as portions of the audio samples to evaluate a speech input as a command also stored in the database for an identified user, wherein the database is continually populated over time by use of the system.

15. A system for confirming audible commands issued to an audio-visual monitoring system of a vehicle comprising: computer memory; a processor executing imaging software, audio processing software, and command processing software; an imaging device transmitting to said imaging software a plurality of sequential frames of digital pixel data from an image acquired within a field of view associated with the imaging device; a speech input device transmitting to said audio processing software an audio data stream of audio samples derived from at least one speech input; wherein said imaging software isolates, from said frames of digital pixel data, a subset of pixels representing a physical source of the speech input; and wherein said command processing software correlates, on a time basis, each audio sample to respective subsets of pixels representing the physical source in respective groups of sequential frames of image data; wherein said imaging software is configured to track multiple positions of said physical source of speech input by deriving respective positions of said physical source from the respective subsets of pixels; wherein said command processing software stores in said memory a voice token profile comprising resulting correlations between said subsets of pixels and said audio samples, and wherein said imaging software accesses said voice token profile for setting image acquisition parameters in the camera.

16. A system according to claim 15, wherein said physical source represented by said subset of pixels is a human mouth.

17. A system according to claim 16, wherein said processor calculates a virtual position of the mouth relative to a set virtual position of said speech input device to determine a direction of input sound.

18. A system according to claim 17, wherein said physical source of speech input comprises a face captured in said subset of pixels to an extent allowing facial feature identification.

* * * * *